United States Patent
Iorio (10) Patent No.: US 8,863,128 B2
(45) Date of Patent: Oct. 14, 2014

(54) SYSTEM AND METHOD FOR OPTIMIZING THE EVALUATION OF TASK DEPENDENCY GRAPHS

(75) Inventor: Francesco Iorio, Toronto (CA)

(73) Assignee: AUTODESK, Inc, San Rafael, CA (US)

( * ) Notice: Subject to any disclaimer, the term of this patent is extended or adjusted under 35 U.S.C. 154(b) by 220 days.

(21) Appl. No.: 13/236,550

(22) Filed: Sep. 19, 2011

(65) Prior Publication Data

US 2012/0084789 A1 Apr. 5, 2012

Related U.S. Application Data

(60) Provisional application No. 61/388,522, filed on Sep. 30, 2010.

(51) Int. Cl.
G06F 9/46 (2006.01)
G06F 9/44 (2006.01)
G06F 9/50 (2006.01)

(52) U.S. Cl.
CPC .................................. *G06F 9/5066* (2013.01)
USPC ........... 718/100; 718/102; 718/104; 718/105; 717/124; 717/127; 717/131; 717/132

(58) Field of Classification Search
None
See application file for complete search history.

(56) References Cited

U.S. PATENT DOCUMENTS

| | | | | |
|---|---|---|---|---|
| 6,064,819 | A * | 5/2000 | Franssen et al. | 717/156 |
| 2003/0028578 | A1 * | 2/2003 | Jain et al. | 709/100 |
| 2005/0188364 | A1 * | 8/2005 | Cockx et al. | 717/159 |
| 2006/0095918 | A1 * | 5/2006 | Hirose | 718/104 |
| 2007/0038987 | A1 * | 2/2007 | Ohara et al. | 717/151 |
| 2007/0283337 | A1 * | 12/2007 | Kasahara et al. | 717/149 |
| 2009/0109230 | A1 * | 4/2009 | Miller et al. | 345/506 |
| 2009/0150893 | A1 * | 6/2009 | Johnson et al. | 718/104 |
| 2009/0254892 | A1 * | 10/2009 | Yamashita | 717/146 |
| 2009/0254913 | A1 * | 10/2009 | Kawano et al. | 718/103 |
| 2010/0106949 | A1 * | 4/2010 | Komatsu et al. | 712/226 |
| 2010/0269103 | A1 * | 10/2010 | Wu et al. | 717/146 |
| 2011/0078426 | A1 * | 3/2011 | Stoitsev | 712/244 |

* cited by examiner

*Primary Examiner* — Charles Swift
(74) *Attorney, Agent, or Firm* — Patterson & Sheridan, LLP (57) ABSTRACT

One embodiment of the present invention is a technique for optimizing a task graph that specifies multiple tasks and the dependencies between the specified tasks. When optimizing the task graph, the optimization engine performs multiple iterations of runtime optimization operations on the task graph. At each iteration, an optimized task graph is generated based on a different task aggregation topology. The optimized task graph is then compiled and executed. Runtime statistics related to the execution are collected, and, in subsequent iterations, the task graph is further optimized based on the collected statistics. Once the optimization process is complete, the most optimal task graph topology that was identified during the process is used to generate an optimized task graph for execution.

20 Claims, 6 Drawing Sheets

SYSTEM AND METHOD FOR OPTIMIZING THE EVALUATION OF TASK DEPENDENCY GRAPHS

CROSS-REFERENCE TO RELATED APPLICATIONS

This application claims benefit of U.S. provisional patent application entitled "System and Method for Optimizing the Evaluation of Fine-Grained Task Dependency Graphs," filed on Sep. 30, 2010 and having a Ser. No. 61/388,522.

BACKGROUND OF THE INVENTION

1. Field of the Invention

The present invention relates generally to the field of parallel processing and, more specifically, to a system and method for optimizing the evaluation of task dependency graphs.

2. Description of the Related Art

A parallel computation environment allows different tasks related to the same program to be executed in parallel. To make use of a parallel computation environment, a compiler decomposes a program into fine-grained tasks that are represented by a task dependency graph. The task dependency graph indicates the dependency between each pair of tasks and the order in which tasks are to be executed.

During the execution of the tasks in the parallel computation environment, each fine-grained task can be executed on a different processing engine within the parallel computation environment. To ensure the proper execution of the program, the execution order and the dependencies between tasks are managed via the task dependency graph and sophisticated task scheduling policies. However, even with optimized task scheduling policies, fine grained tasks result in a large amount of overhead on the parallel computation environment.

More specifically, each processing engine within the parallel computation environment needs to communicate with every other processing engine to indicate the completion of different tasks. Requiring inter-engine communication increases the processing burden on the processing engine as state needs to be managed and tracked constantly. In addition, tasks that are not dependent on any outstanding tasks but are not at the top of the input queue are not processed even when there is processing bandwidth, thus unnecessarily slowing down the processing of work.

As the foregoing illustrates, what is needed in the art is a mechanism for optimizing the evaluation of tasks specified by a task dependency graph.

SUMMARY OF THE INVENTION

One embodiment of the present invention is a computer-implemented method for optimizing a task graph that delineates a plurality of tasks to be evaluated in a parallel processing environment. The method includes generating a first aggregation topology associated with the task graph that divides the plurality of tasks into a first collection of sets, wherein each set in the first collection of sets includes one or more tasks from the plurality of tasks, and each task of the plurality of tasks belongs to only one set included in the first collection of sets, compiling the plurality of tasks according to the first task aggregation topology to generate units of work to be executed in the parallel processing environment, collecting statistics associated with executing the units of work in the parallel processing environment, and determining whether the first task aggregation topology is more efficient in execution than any previously-defined task aggregation topology based on the statistics, and if the task aggregation topology is more efficient in execution than any previously-defined task aggregation topology, then selecting the first task aggregation topology as the most optimal task aggregation topology, or if the first task aggregation topology is not more efficient in execution than any previously-defined task aggregation topology, then selecting a second task aggregation topology as the most optimal task aggregation topology.

Advantageously, the task aggregation technique described above allows for tasks that can be combined together to be processed as a single unit of work. By processing multiple tasks as a single unit of work, the overhead that would otherwise be imposed if the tasks were processed independently is eliminated, thereby increasing the processing efficiency of a set of tasks. In addition, the optimization process described above iteratively and at runtime converges to an optimal aggregation for a set of tasks based on the configuration of the parallel processing environment. The optimal aggregation is, therefore, tailored to execute efficiently on the specific parallel processing environment.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
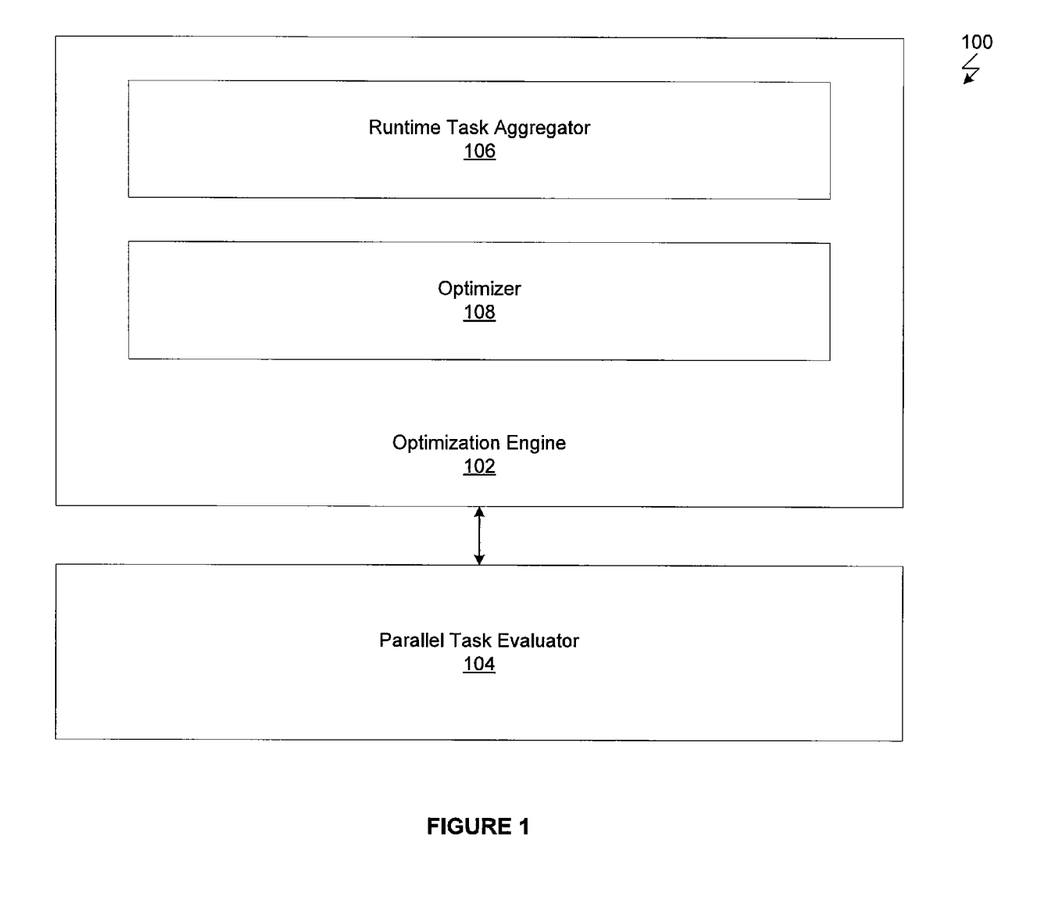
FIG. 1 is a block diagram illustrating a task graph optimization system configured to implement one or more aspects of the present invention.

FIG. 1 is a block diagram illustrating a task graph optimization system 100 configured to implement one or more aspects of the present invention. As shown, the task graph optimization system 100 includes an optimization engine 102 and a parallel task evaluator 104.

The optimization engine 102 performs optimization operations at runtime on a task graph that specifies multiple tasks. The optimization operations are based on characteristics and configurations associated with the multi-processor execution environment within which the task graph is to be evaluated.

To optimize a task graph, the optimization engine 102 aggregates tasks specified by the task graph such that the tasks are evaluated in an efficient manner. Efficiency is determined based on certain performance metrics that include processing time, memory use, or a combination thereof. Any technically feasible performance metric is within the scope of the current invention.

A task graph includes connected nodes, where each node is associated with a particular task, and where the connection between two different nodes describes the dependency relationship between the tasks associated with the two nodes. Tasks specified by the task graph that are independent of one another can be processed in parallel, whereas tasks that are dependent on one another need to be processed serially and in order. Typically, each task specified by a task graph is associated with a set of inputs and, when processed by a processing engine, generates a set of outputs. Before a task can be processed, a pre-determined scheduling overhead is imposed, where scheduling information, such as context related to the task, is set up within the processing engine.

When optimizing the task graph, the optimization engine 102 performs multiple iterations of runtime optimization operations on the task graph. At each iteration, an optimized task graph is generated based on a different task aggregation topology. The optimized task graph is then compiled and executed. Runtime statistics related to the execution are collected, and, in subsequent iterations, the task graph is further optimized based on the collected statistics. Once the optimization process is complete, the most optimal task graph topology that was identified during the process is used to generate an optimized task graph for execution.

In operation, at each iteration, the runtime task aggregator 106 within the optimization engine 102 compiles tasks according to a pre-determined task aggregation topology to generate units of work associated with the tasks. The task aggregation topology indicates which tasks in the task graph are to be aggregated into a macro-task and which tasks are independent of one another and, therefore, can be processed in parallel. In one embodiment, the task aggregation topology is a bit mask that indicates whether each pair of tasks specified by the task graph is in the same macro-task. Tasks that are included in the same macro-task are compiled by the runtime task aggregator into the same unit of work, i.e., into a single executable binary. Tasks that are within the same unit of work are called via a single function pointer, easily share inputs and outputs and are scheduled for processing within a processing engine via a single scheduling operation.

Once generated, the units of work are processed within the parallel task evaluator 104. The parallel task evaluator 104 is a multi-processor execution environment that is configured to execute units of work in parallel. Statistics related to the execution are collected during the execution of the units of work within the parallel task evaluator 104. The statistics include processing time, memory usage, or any other technically feasible performance statistic related to the execution.

The optimizer 108 analyzes the statistics related to the execution of the units of work to determine whether the current task aggregation topology is an optimal task aggregation topology. In one embodiment, the optimizer 108 compares the statistics related to the execution with previously-gathered statistics related to the execution of units of work generated based on a different task aggregation topology. If the previously-gathered statistics indicate that the different task aggregation topology is more optimal than the current task aggregation topology, then the current task aggregation topology is not an optimal task aggregation topology. If, however, the previously-gathered statistics indicate that the different task aggregation topology is less optimal than the current task aggregation topology, then the current task aggregation topology is an optimal task aggregation topology. If the current task aggregation topology is an optimal task aggregation topology, then the optimizer 108 stores the current task aggregation topology as the most optimal aggregation topology identified yet.

In addition, in an effort to further optimize the task graph, the optimizer 108 generates a new task aggregation topology based on the collected statistics. The new task aggregation topology is generated via a function minimizing operation. Any technically feasible function minimizing operation is within the scope of the current invention. For example, in one embodiment, the function minimizing operation implements a pattern search optimization algorithm, and, in another embodiment, the function minimizing operation implements a genetic algorithm. The new task aggregation topology is transmitted to the runtime task aggregator, and a new iteration of runtime optimization commences.

The runtime task aggregator 106 and the optimizer 108 continue to perform iterations of runtime optimizations on the task graph until the most optimal aggregation topology is identified. In one embodiment, the number of iterations is pre-determined. In such an embodiment, once the pre-determined number of iterations is performed, the optimizer 108 selects the most optimal aggregation topology identified yet as the identified topology. In another embodiment, the runtime task aggregator 106 and the optimizer 108 continue to perform iterations of runtime optimizations until a pre-defined goal is met, i.e., one or more performance metrics are satisfied. In such an embodiment, the task aggregation topology that satisfies the pre-defined goal is selected as the identified topology.

Figure 2A:
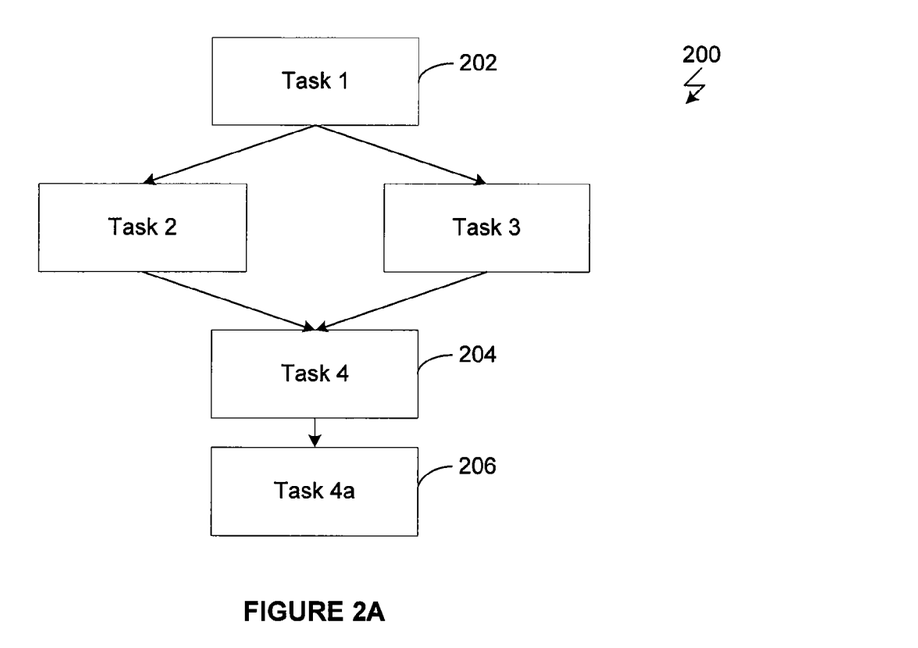
FIG. 2A illustrates a task graph, according to one embodiment of the present invention.

FIG. 2A illustrates a task graph 200, according to one embodiment of the present invention. As shown, the task graph 200 includes nodes 202, 204 and 206. Each of the nodes 202, 204 and 206 is associated with a different task. For example, node 202 is associated with Task 1, node 204 is associated with Task 4 and node 206 is associated with Task 4a. As also shown, Task 2, Task 3 and Task 4 are dependent on Task 1.

Figure 2B:
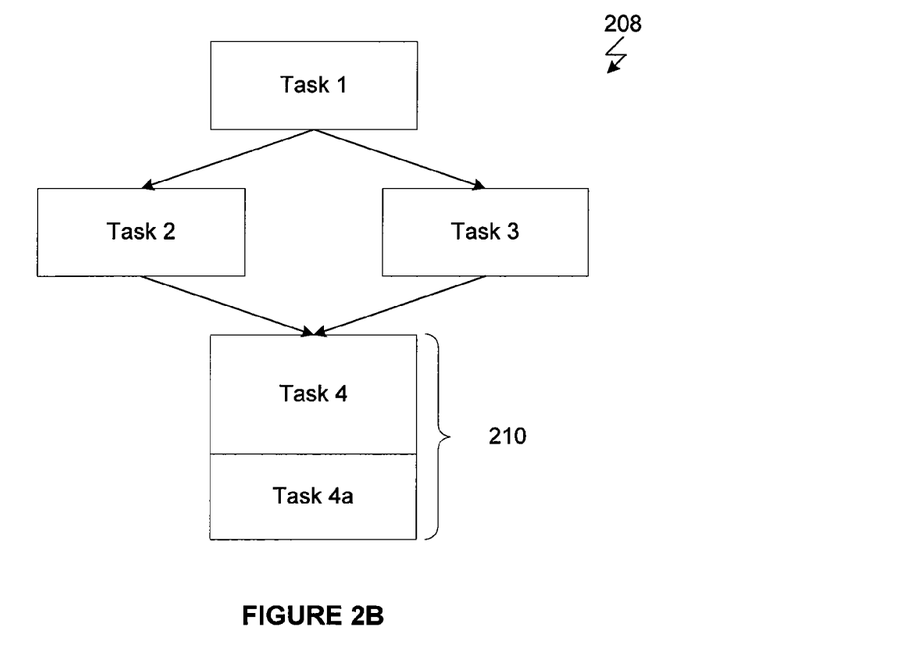
FIG. 2B illustrates an aggregated task graph, according to one embodiment of the present invention.

FIG. 2B illustrates an aggregated task graph 208, according to one embodiment of the present invention. The aggregated task graph 208 is generated when a task aggregation topology is applied to the task graph 200 of FIG. 2A. As shown, the nodes 204 and 206 in FIG. 2A are aggregated to generate a corresponding macro-node 210. The macro-node 210 is associated with both Task 4 and 4a that were previously associated with two different nodes, node 204 and node 206. The macro-node 210 is compiled by the runtime task aggregator 106 into a single unit of work.

Figure 3:
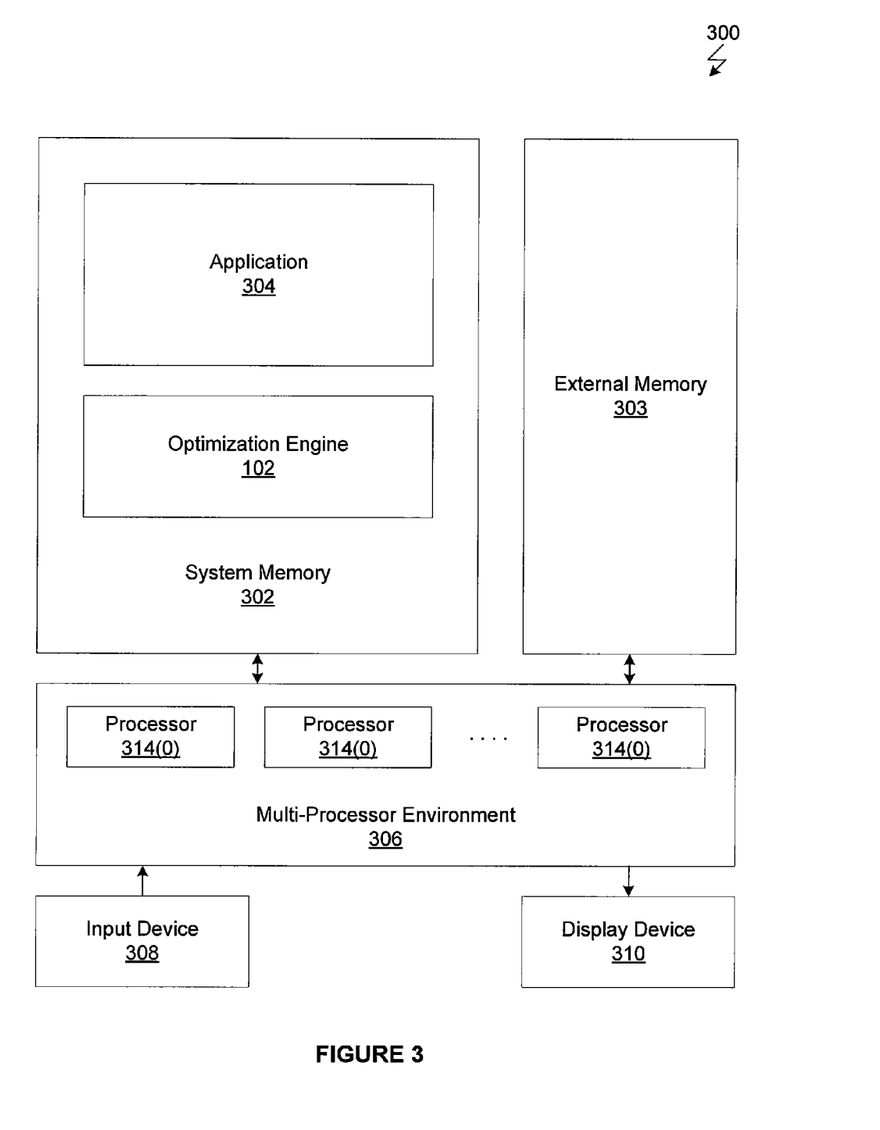
FIG. 3 is a block diagram of a computer system configured to implement one or more aspects of the invention.

FIG. 3 is a block diagram of a computer system 300 configured to implement one or more aspects of the invention. As shown, the system 300 includes a system memory 302, an external memory 303, a multi-processor environment 306, an input device 308 and a display device 310.

The system memory 302 includes an application 304 and the optimization engine 102 of FIG. 1. The system memory 302 is a memory space, usually a random access memory (RAM), that temporarily stores software programs running within the system 300 at any given time. The application 304 is a software program that is composed of one or more algorithms that can be decomposed into a directed task graph of fine grained independent tasks. For example, a computer graphics algorithm that continuously performs various consecutive geometric operations on a group of objects is decomposed into a task graph representing the individual operations.

The optimization engine 102 performs multiple iterations of runtime optimization operations on the task graph associated with the application 304. As previously described herein, at each iteration, an optimized task graph is generated based on a different task aggregation topology. The optimized task graph is then compiled and executed. Runtime statistics related to the execution are collected, and, in subsequent iterations, the task graph is further optimized based on the collected statistics. Once the optimization process is complete, the most optimal task graph topology that was identified during the process is used to generate an optimized task graph for execution by the application.

The multi-processor environment 306 includes multiple processors 314 that each execute a sequence of stored instructions associated with and/or transmitted from the various elements in the computer system 300 including the application 304 and the optimization engine 102. The external memory 303 is a storage device, e.g. a hard disk, for storing data associated with the application 314. The input device 308 is an end-user controlled input device, e.g. a mouse or keyboard, that allows a user to manipulate various aspects of the application 304 and/or the optimization engine 102. The display device 310 may be a cathode-ray tube (CRT), a liquid crystal display (LCD) or any other type of display device.

In an alternate embodiment, each of the application 304 and the optimization engine 102 execute in different computer systems similar to the computer system 300. In such an embodiment, the task graph is optimized in the computer system that executes the optimization engine 102, and the optimized task graph is transmitted to the application 302 for execution on the computer system that executes the application 302.

Figure 4:
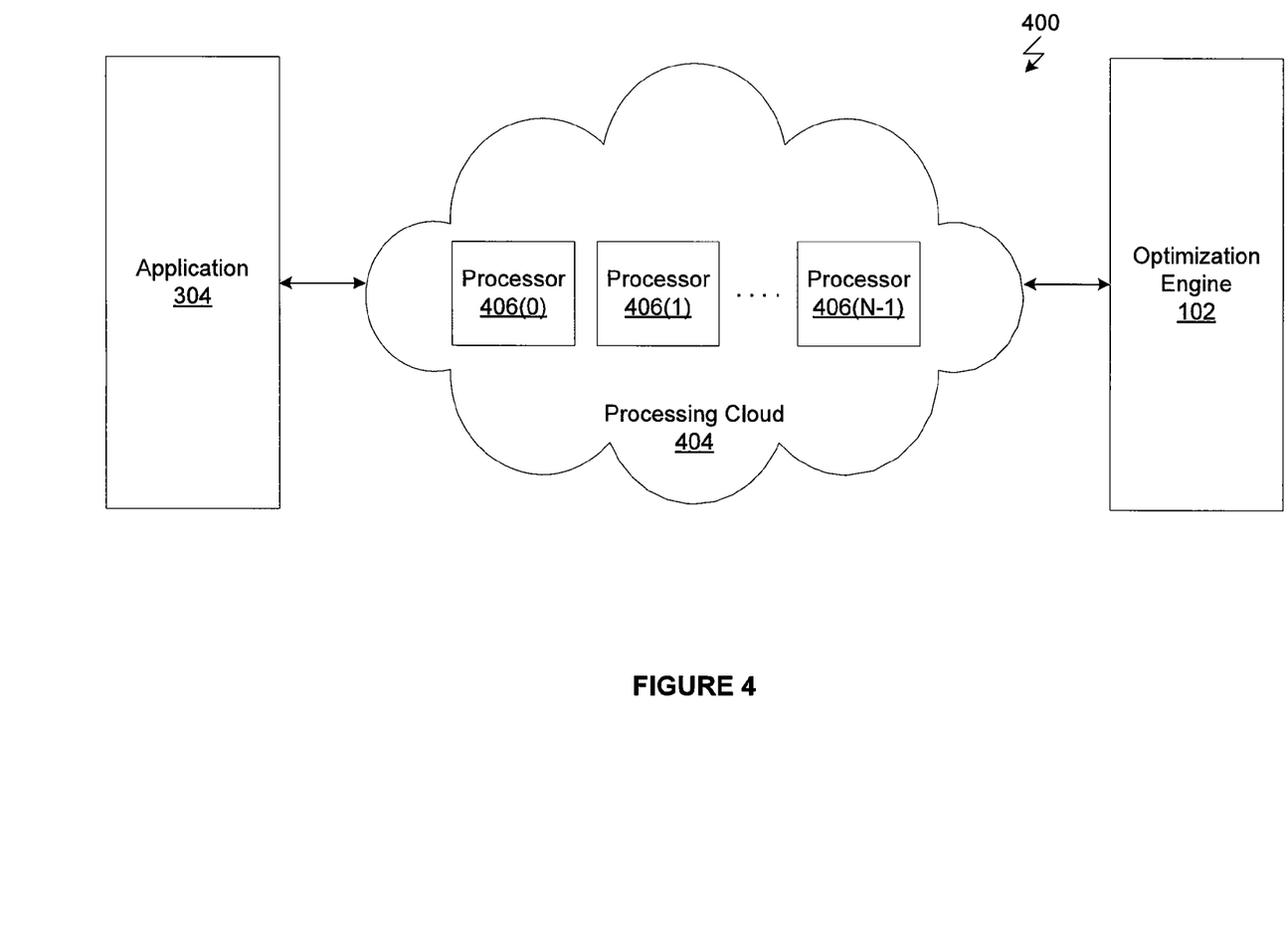
FIG. 4 illustrates a cloud computing environment configured to implement one or more aspects of the invention.

FIG. 4 illustrates a cloud computing environment 500 configured to implement one or more aspects of the invention. As shown, the cloud computing environment 400 includes the application 304, the optimization engine 102 and a processing cloud 404.

The processing cloud 404 includes a collection of resources, such as hardware resources, platform resources and infrastructure resources, and manages the allocation of those resources to different applications. The optimization engine 102 and the application 304 execute, at least partially, on resources provided by the processing cloud 404. More specifically, the optimization engine 302 executes within the processing cloud 404 such that the iterations of task optimization operations are executed on the processors 406 within the processing cloud 404. Further, the application 304 also executes within the processing cloud 404 such that the optimized task graph related to the application 304 is executed by the processors 406.

Figure 5A:
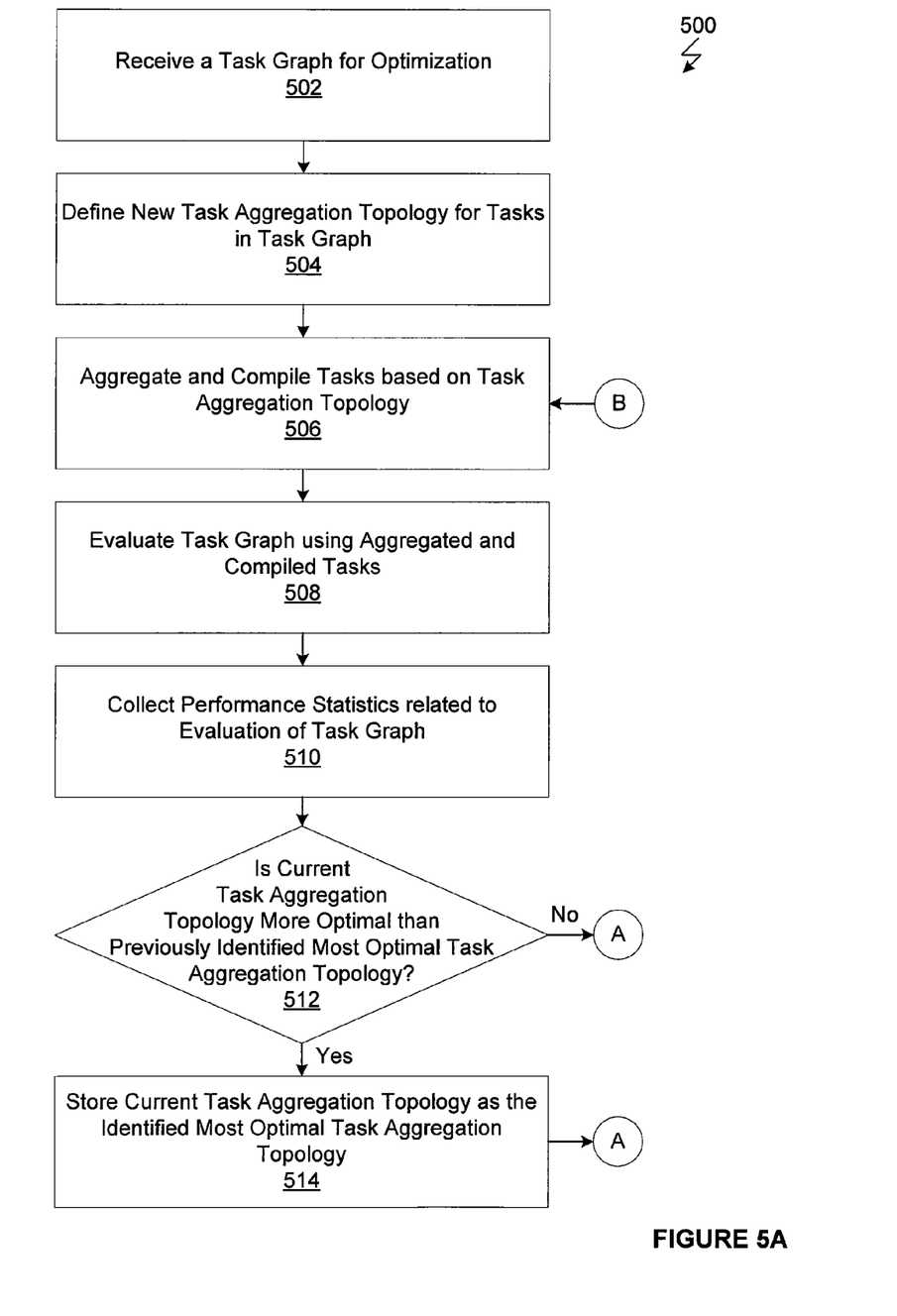
FIGS. 5A and 5B set forth a flow diagram of method steps for optimizing a task graph for more efficient execution, according to one embodiment of the present invention.
Figure 5B:
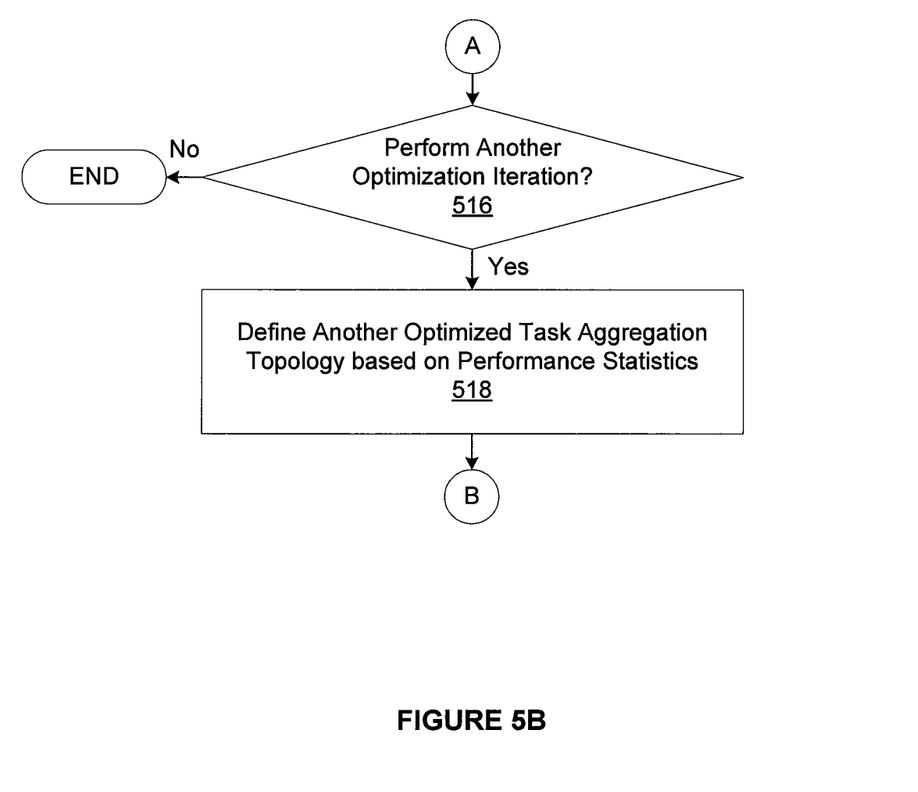

FIGS. 5A and 5B set forth a flow diagram of method steps for optimizing a task graph for more efficient execution, according to one embodiment of the present invention. Although the method steps are described in conjunction with the systems for FIGS. 1-2, persons skilled in the art will understand that any system configured to perform the method steps, in any order, is within the scope of the invention.

The method 500 begins at step 502, where the optimization engine 102 receives a task graph for optimization from the application 304. At step 504, the optimizer 108 within the optimization engine 102 generates an initial task aggregation topology for the different tasks specified by the task graph. As previously described herein, a task aggregation topology indicates which tasks in the task graph are to be aggregated into a macro-task and which tasks are independent of one another and, therefore, can be processed in parallel.

At step 506, the runtime task aggregator 106 within the optimization engine 102 compiles tasks specified by the task graph according to the task aggregation topology to generate units of work associated with the tasks. At step 508, the parallel task evaluator evaluates the task graph by processing the units of work associated with the tasks generated at step 506. At step 510, the optimizer 108 collects statistics related to the execution of the units of work within the parallel task evaluator 104. The statistics include processing time, memory usage, or any other technically feasible performance statistic related to the execution.

At step 512, the optimizer 108 analyzes the statistics collected at step 510 to determine whether the task aggregation topology is more optimal than a previously identified optimal task aggregation topology. In one embodiment, the optimizer 108 compares the statistics collected at step 510 with previously-collected statistics related to the previously identified optimal task aggregation topology. If the previously-collected statistics indicate that the different task aggregation topology is more optimal than the current task aggregation topology, then the current task aggregation topology is not a more optimal task aggregation topology. If, however, the previously-gathered statistics indicate that the previously identified optimal task aggregation topology is less optimal than the current task aggregation topology, then the current task aggregation topology is a more optimal task aggregation topology.

If, at step 512, the current task aggregation topology is more optimal than the previously identified optimal task aggregation, then the method 500 proceeds to step 514. At step 514, the optimizer 108 stores the current task aggregation topology as the most optimal aggregation topology identified yet. The method 500 then proceeds to step 516.

At step 516, the optimizer 108 determines whether another iteration of runtime optimization operations should be performed on the task graph. In one embodiment, the number of iterations to be performed on the task graph is pre-determined. In such an embodiment, once the pre-determined number of iterations is performed, the optimizer 108 selects the most optimal aggregation topology identified yet as the identified topology. In another embodiment, iterations of runtime optimizations are performed on the task graph until a pre-defined goal is met, i.e., one or more performance metrics are satisfied. In such an embodiment, the task aggregation topology that satisfies the pre-defined goal is selected as the identified topology.

If, at step 516, the optimizer 108 determines that another iteration of runtime optimization operations should be performed on the task graph, then the method 500 proceeds to step 518. At step 518, the optimizer 108 generates a new task aggregation topology based on the statistics collected at step 510 via a function minimizing operation. As previously described herein, any technically feasible function minimizing operation is within the scope of the current invention.

If, however, at step 516, the optimizer 108 determines that another iteration of runtime optimization operations does not need to be performed on the task graph, then the method 500 ends. The most optimal aggregation topology identified yet is used to generate an optimized task graph that is transmitted to the application 304 for execution.

Referring back to step 512, if the current task aggregation topology is more optimal than the previously identified optimal task aggregation, then the method 500 proceeds to step 516 described previously herein.

In sum, when optimizing the task graph, the optimization engine performs multiple iterations of runtime optimization operations on the task graph. At each iteration, an optimized task graph is generated based on a different task aggregation topology. The optimized task graph is then compiled and executed. Runtime statistics related to the execution are collected, and, in subsequent iterations, the task graph is further optimized based on the collected statistics. Once the optimization process is complete, the most optimal task graph topology that was identified during the process is used to generate an optimized task graph for execution.

Advantageously, the task aggregation technique described above allows for tasks that can be combined together to be processed as a single unit of work. By processing multiple tasks as a single unit of work, the overhead that would otherwise be imposed if the tasks were processed independently is eliminated, thereby increasing the processing efficiency of a set of tasks. In addition, the optimization process described above iteratively and at runtime converges to an optimal aggregation for a set of tasks based on the configuration of the parallel processing environment. The optimal aggregation is, therefore, tailored to execute efficiently on the specific parallel processing environment.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

I claim:

1. A computer-implemented method for optimizing a task graph that delineates a plurality of tasks to be evaluated in a parallel processing environment, the method comprising:
    generating a first task aggregation topology associated with the task graph that divides the plurality of tasks into a first collection of sets, wherein each set in the first collection of sets includes one or more tasks from the plurality of tasks, each task of the plurality of tasks belongs to only one set included in the first collection of sets, and the first task aggregation topology comprises a bit mask that indicates two or more tasks of the plurality of tasks that are included in a first set in the first collection of sets;
    compiling the plurality of tasks according to the first task aggregation topology to generate units of work to be executed in the parallel processing environment, wherein the two or more tasks included in the first set are compiled to generate a single unit of work that is executed by a first processing engine included in the parallel processing environment;
    collecting statistics associated with executing the units of work in the parallel processing environment; and
    determining whether the first task aggregation topology is more efficient in execution than any previously-defined task aggregation topology based on the statistics; and
    if the task aggregation topology is more efficient in execution than any previously-defined task aggregation topology, then selecting the first task aggregation topology as the most optimal task aggregation topology, or
    if the first task aggregation topology is not more efficient in execution than any previously-defined task aggregation topology, then selecting a second task aggregation topology as the most optimal task aggregation topology.

2. The method of claim 1, wherein the first task aggregation topology is defined based on the configuration of the parallel processing environment.

3. The method of claim 1, wherein the statistics include a total execution time associated with executing the units of work in the parallel processing environment.

4. The method of claim 1, wherein the execution statistics include a total amount of memory consumed when executing the units of work in the parallel processing environment.

5. The method of claim 1, wherein determining whether the first task aggregation topology is more optimal than a previously-defined task aggregation topology comprises comparing the statistics associated with executing the units of work in the parallel processing environment with previously-collected statistics associated with executing units of work in the parallel processing environment based on a previously-defined task aggregation topology.

6. The method of claim 1, further comprising generating the second task aggregation topology associated with the task graph that divides the plurality of tasks into a second collection of sets, wherein each set in the second collection of sets includes one or more tasks from the plurality of tasks, and each task of the plurality of tasks belongs to only one set in the second collection of sets.

7. The method of claim 6, wherein the second task aggregation topology comprises a previously-defined task aggregation topology.

8. The method of claim 6, wherein the second task aggregation is defined based on the first task aggregation topology and the statistics associated with the executing the units of work in the parallel processing environment.

9. A non-transitory computer readable medium storing instructions that, when executed by a processor, cause the processor to optimized a task graph that delineates a plurality of tasks to be evaluated in a parallel processing environment, by performing the steps of:
    generating a first task aggregation topology associated with the task graph that divides the plurality of tasks into a first collection of sets, wherein each set in the first collection of sets includes one or more tasks from the plurality of tasks, each task of the plurality of tasks belongs to only one set included in the first collection of sets, and the first task aggregation topology comprises a bit mask that indicates two or more tasks of the plurality of tasks that are included in a first set in the first collection of sets;
    compiling the plurality of tasks according to the first task aggregation topology to generate units of work to be executed in the parallel processing environment, wherein the two or more tasks included in the first set are compiled to generate a single unit of work that is executed by a first processing engine included in the parallel processing environment;

collecting statistics associated with executing the units of work in the parallel processing environment; and determining whether the first task aggregation topology is more efficient in execution than any previously-defined task aggregation topology based on the statistics; and if the task aggregation topology is more efficient in execution than any previously-defined task aggregation topology, then selecting the first task aggregation topology as the most optimal task aggregation topology, or if the first task aggregation topology is not more efficient in execution than any previously-defined task aggregation topology, then selecting a second task aggregation topology as the most optimal task aggregation topology.

10. The non-transitory computer readable medium of claim 9, wherein the first task aggregation topology is defined based on the configuration of the parallel processing environment.

11. The non-transitory computer readable medium of claim 9, wherein the statistics include a total execution time associated with executing the units of work in the parallel processing environment.

12. The non-transitory computer readable medium of claim 9, wherein the execution statistics include a total amount of memory consumed when executing the units of work in the parallel processing environment.

13. The non-transitory computer readable medium of claim 9, wherein determining whether the first task aggregation topology is more optimal than a previously-defined task aggregation topology comprises comparing the statistics associated with executing the units of work in the parallel processing environment with previously-collected statistics associated with executing units of work in the parallel processing environment based on a previously-defined task aggregation topology.

14. The non-transitory computer readable medium of claim 9, further comprising generating the second task aggregation topology associated with the task graph that divides the plurality of tasks into a second collection of sets, wherein each set in the second collection of sets includes one or more tasks from the plurality of tasks, and each task of the plurality of tasks belongs to only one set in the second collection of sets.

15. The non-transitory computer readable medium of claim 14, wherein the second task aggregation topology comprises a previously-defined task aggregation topology.

16. The non-transitory computer readable medium of claim 14, wherein the second task aggregation is defined based on the first task aggregation topology and the statistics associated with the executing the units of work in the parallel processing environment.

17. The non-transitory computer readable medium of claim 9, wherein the single unit of work comprises a single executable binary.

18. A computer system, comprising:

a parallel processing environment having one or more processing engines; and an optimization engine configured to optimize a task graph delineates a plurality of tasks to be evaluated in the parallel processing environment, by performing the steps of:

generating a first task aggregation topology associated with the task graph that divides the plurality of tasks into a first collection of sets, wherein each set in the first collection of sets includes one or more tasks from the plurality of tasks, each task of the plurality of tasks belongs to only one set included in the first collection of sets, and the first task aggregation topology comprises a bit mask that indicates two or more tasks of the plurality of tasks that are included in a first set in the first collection of sets;

compiling the plurality of tasks according to the first task aggregation topology to generate units of work to be executed in the parallel processing environment, wherein the two or more tasks included in the first set are compiled to generate a single unit of work that is executed by a first processing engine included in the parallel processing environment;

collecting statistics associated with executing the units of work in the parallel processing environment; and determining whether the first task aggregation topology is more optimal than any previously-defined task aggregation topology based on the statistics; and if the task aggregation topology is more optimal than any previously- defined task aggregation topology, then selecting the first task aggregation topology as the most optimal task aggregation topology, or if the first task aggregation topology is not more optimal than any previously-defined task aggregation topology, then selecting a second task aggregation topology as the most optimal task aggregation topology.

19. The computer system of claim 18, wherein the task graph is generated by an application executing within the computer system.

20. The method of claim 1, wherein the single unit of work comprises a single executable binary.

* * * * *